Figure 1:
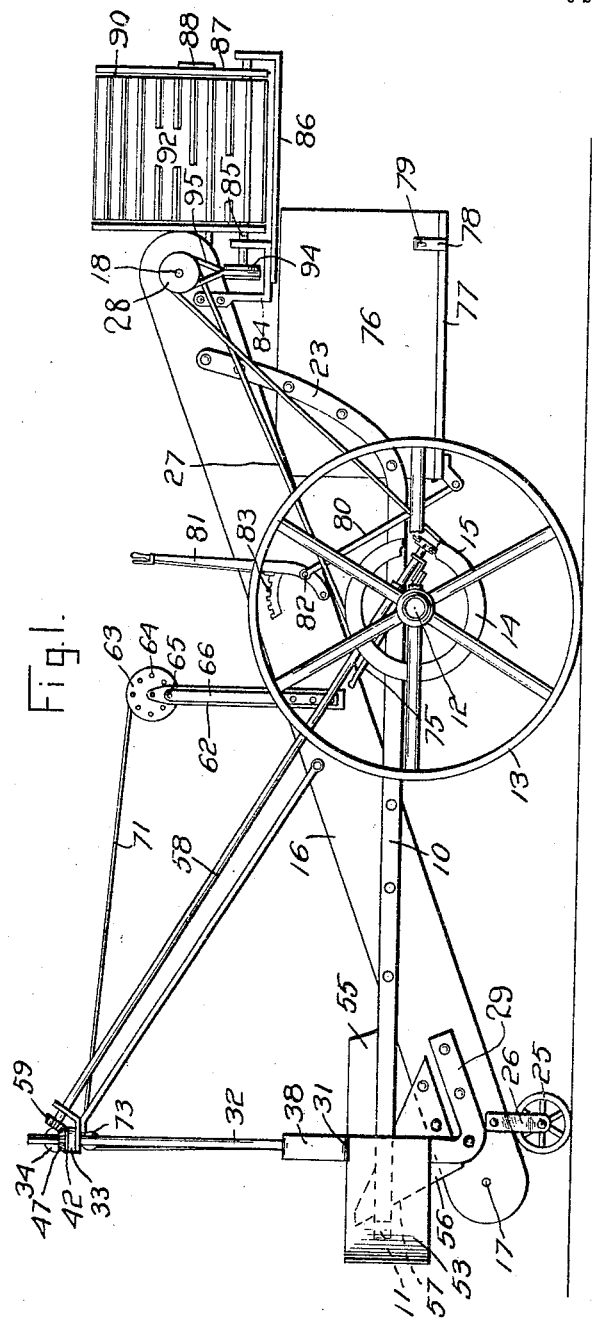
Figure 2:
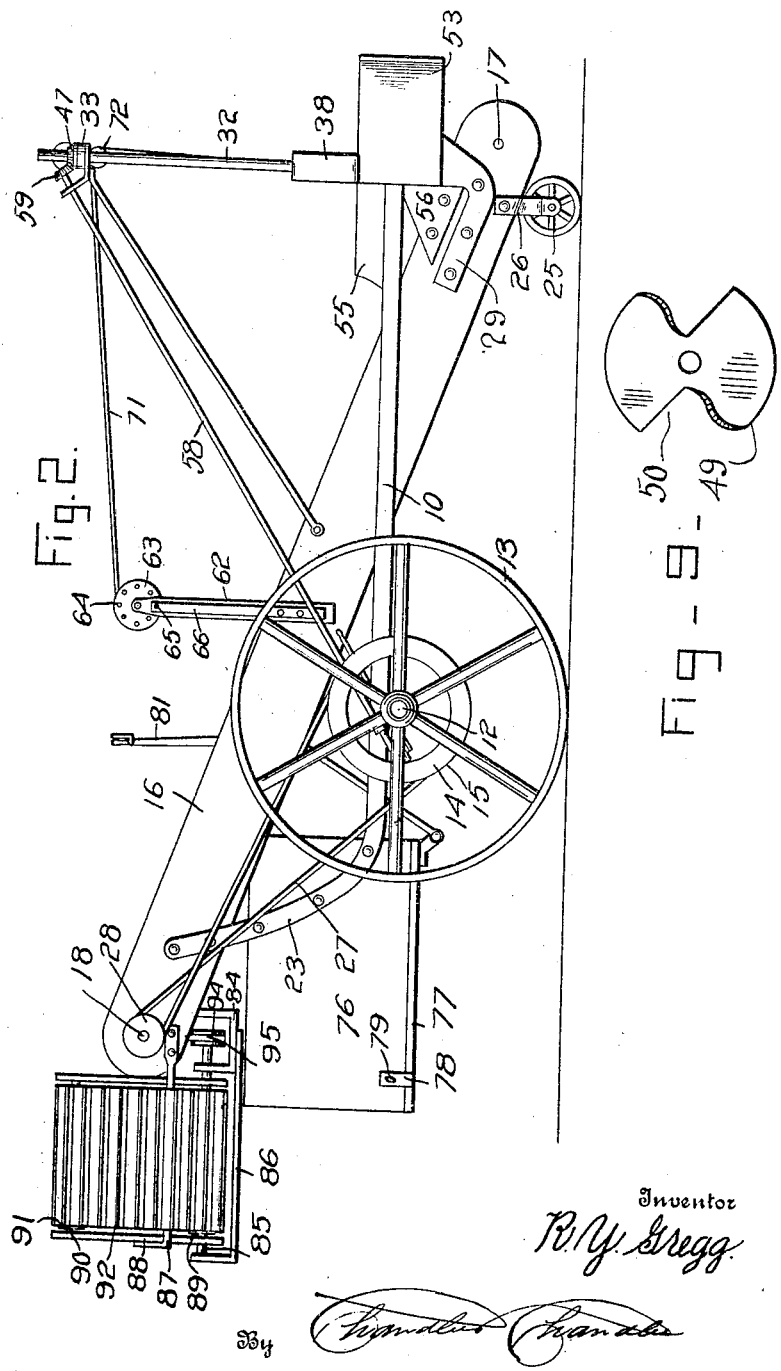
Figure 3:
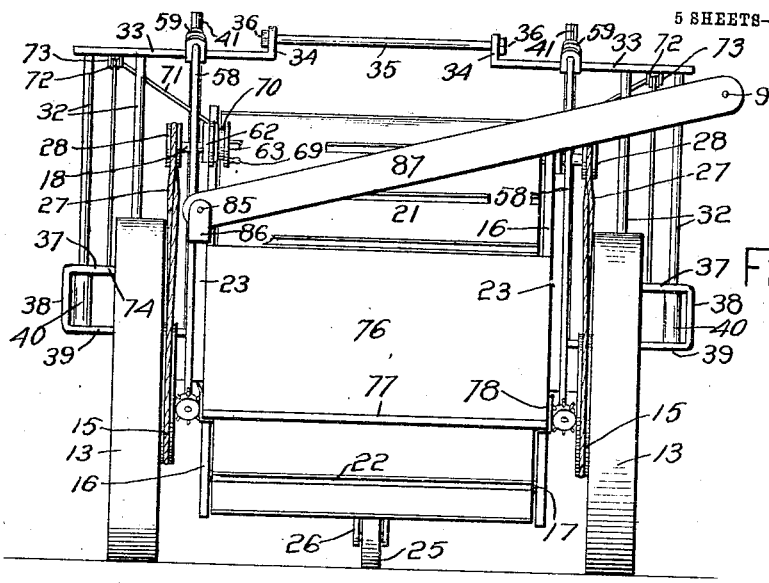
Figure 4:
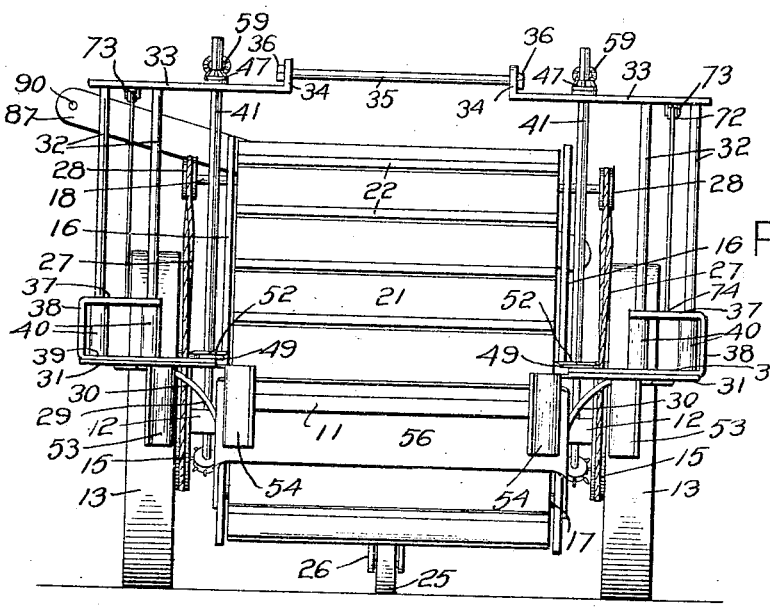

R. Y. GREGG.
HARVESTER.
APPLICATION FILED MAR. 4, 1907.

936,121.

Patented Oct. 5, 1909.
5 SHEETS—SHEET 1.

Witnesses
E. K. Reichenbach
H. G. Smith

Inventor
R. Y. Gregg

By Chandler & Chandler
Attorneys

R. Y. GREGG.
HARVESTER.
APPLICATION FILED MAR. 4, 1907.

936,121.

Patented Oct. 5, 1909.
5 SHEETS—SHEET 3.

Witnesses

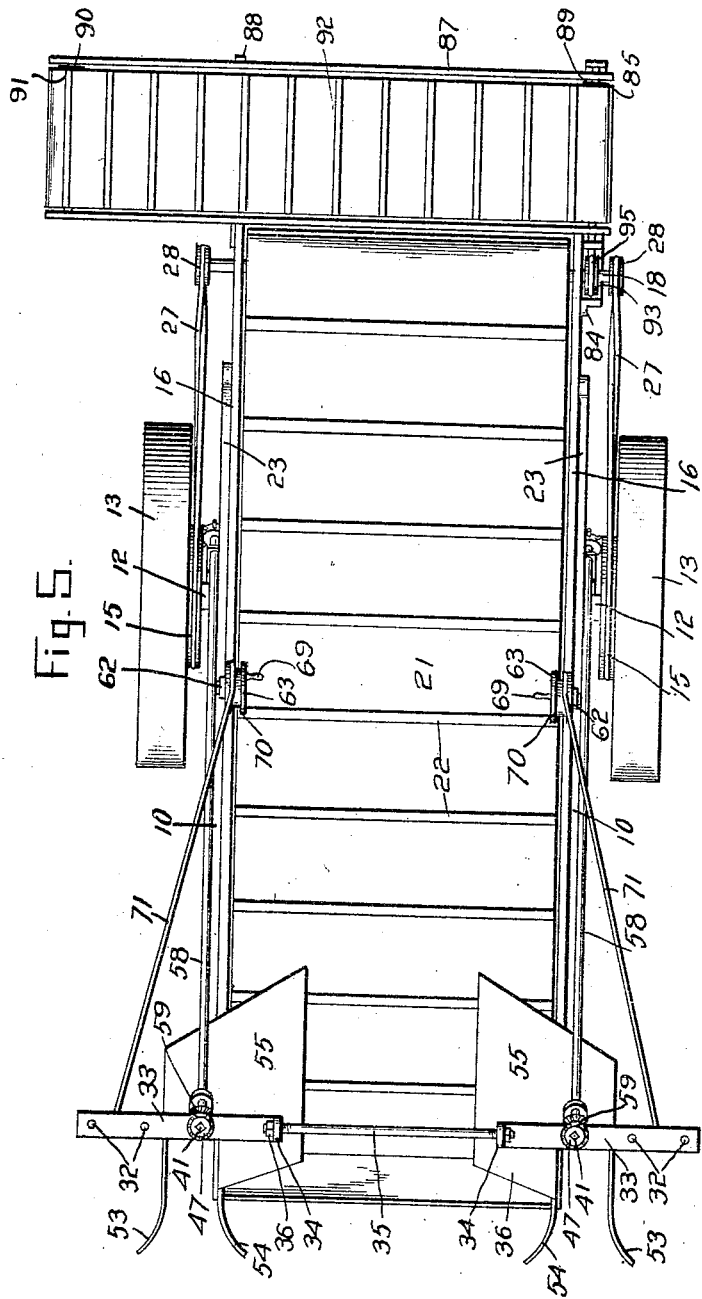

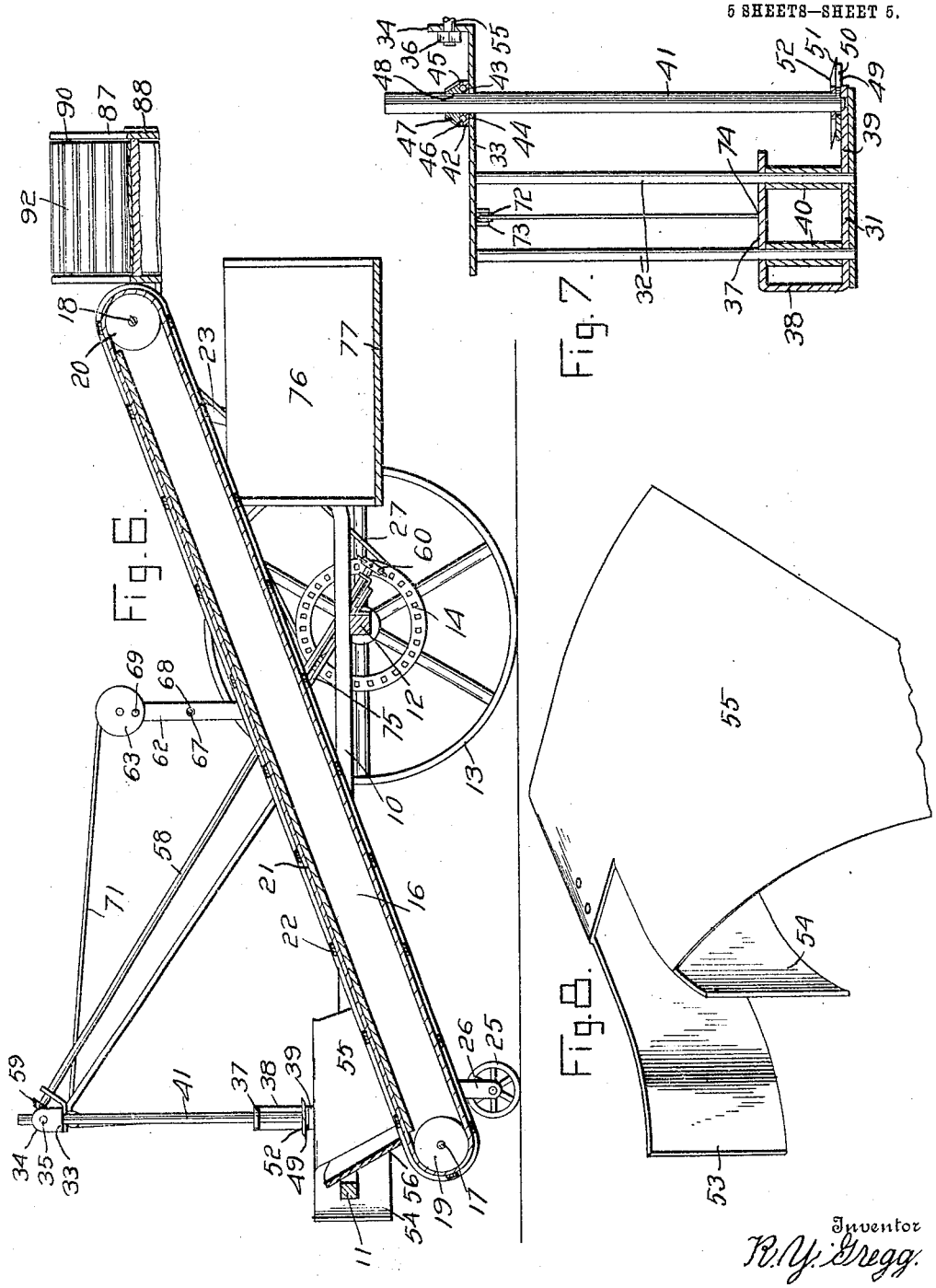

Inventor
R. Y. Gregg
By Chandler & Chandler
Attorneys